United States Patent
Yamanaka

[19]

[11] Patent Number: 5,892,749
[45] Date of Patent: Apr. 6, 1999

[54] OPTICAL HEAD DEVICE FOR READING TWO OPTICAL DISKS

[75] Inventor: Yutaka Yamanaka, Tokyo, Japan

[73] Assignee: NEC Corporation, Tokyo, Japan

[21] Appl. No.: 798,038

[22] Filed: Feb. 6, 1997

[30] Foreign Application Priority Data

Feb. 6, 1996 [JP] Japan ..................................... 8-019743

[51] Int. Cl.6 .................................................. G11B 7/135
[52] U.S. Cl. .................. 369/112; 369/44.14; 369/44.37; 369/94; 369/110
[58] Field of Search ............................ 369/112, 34, 110, 369/44.37, 44.14, 44.23

[56] References Cited

U.S. PATENT DOCUMENTS

| | | | |
|---|---|---|---|
| 5,144,617 | 9/1992 | Gotoh et al. | 369/112 |
| 5,526,338 | 6/1996 | Hasman et al. | 369/94 |
| 5,673,247 | 9/1997 | Sekimoto et al. | 369/112 |
| 5,682,373 | 10/1997 | Kim | 369/112 |
| 5,784,354 | 7/1998 | Lee | 369/112 |

FOREIGN PATENT DOCUMENTS

| | | |
|---|---|---|
| 0 470 807 | 2/1992 | European Pat. Off. . |
| 0 610 055 | 8/1994 | European Pat. Off. . |
| 0 712 122 | 5/1996 | European Pat. Off. . |
| 62-109241 | 5/1987 | Japan . |
| 63-016429 | 1/1988 | Japan . |
| 5-2425821 | 9/1993 | Japan . |
| 6-150434 | 5/1994 | Japan . |
| 7-037259 | 2/1995 | Japan . |
| 59-142758 | 8/1984 | WIPO . |

*Primary Examiner*—Tod R. Swann
*Assistant Examiner*—Kim-Kwok Chu
*Attorney, Agent, or Firm*—Young & Thompson

[57] ABSTRACT

An optical head reader includes a laser light source; a polarization beam splitter for dividing first and second linearly polarized beams having first and second polarization directions which are perpendicular to each other; an optical transmission system for transmitting the first and second beams along first and second optical paths which are parallel to each other; a quarter wavelength plate for converting the first and second beams into first and second circularly polarized beams having polarization planes rotated in first and second directions opposite to each other; and a pair of first and second objective lenses provided having first and second focal lengths which are different from each other, so that one of the first and second circularly polarized beams is focused on an optical disk surface. The first and second circularly polarized beams are reflected by the optical disk surface and subsequently transmitted through the first and second objective lenses to the quarter wavelength plate, whereby the first and second circularly polarized beams are converted into third and fourth linearly polarized beams having the second and first polarization directions. The third and fourth beams are transmitted through the optical transmission system to the polarization beam splitter, whereby the third and fourth beams are transmitted along a common optical path to a single optical detecting system.

7 Claims, 3 Drawing Sheets

OPTICAL HEAD DEVICE FOR READING TWO OPTICAL DISKS

BACKGROUND OF THE INVENTION

The present invention relates to an optical head device, and more particularly to an optical head device operable with optical disks of various sizes, such as compact disks of diverse thicknesses.

Generally, optical disk devices have used an optical head having a transparent substrate, through which a laser beam is transmitted to form a micro-spot on a micron-order surface of a storage medium, wherein the transparent substrate protects the micron-order surface of the storage medium. The transparent substrate is a transparent parallel plane plate through which a converging beam is transmitted, for which reason a wave-front aberration depending upon a thickness of the parallel plane substrate appears on the transmitting beam. If the wave-front aberration is large, then a convergence spot is enlarged beyond a diffraction limit whereby it is difficult to obtain desired recording/replaying properties. In order to settle those problems, it is required to form a micro-spot as small as possible in the light of the diffraction limit on the storage medium surface to compensate such wave-front aberration.

The regulation of the thickness of the optical disk is variable, depending on the use. If the thickness of the optical disk is varied, then the amount of compensation to the wave-front aberration is also varied, for which reason the conventional optical head is operable with recording/replaying optical disk mediums having a certain thickness and being designed under a certain regulation. Namely, the conventional optical head is not operable with the various optical disk mediums designed in accordance with the various regulations.

In order to settle the above problem, an optical head device was proposed, which is capable of switching twin lenses in accordance with the various optical disks wherein the twin lenses are mounted on an actuator. This optical head device is disclosed in the "TECHNICAL REPORT OF THE INSTITUTE OF ELECTRONICS INFORMATION AND COMMUNICATION ENGINEERS", MR95-25, August 1995.

FIG. 1 is illustrative of a mechanical structure of the actuator provided in the above conventional optical head device having twin lenses. The actuator is provided with a movable plate 10 on which a first objective lens 7 and a second objective lens 8 are mounted. The movable plate 10 is provided to rotate around an axis 21 in a predetermined angle range. The first and second objective lenses 7 and 8 are spaced from the axis 21 around which the movable plate 10 rotates so that the first and second objective lenses 7 and 8 are switched by the rotation of the movable plate 10. Either a reflective mirror or a reflective prism is provided on a base of the actuator so that the reflective mirror or the reflective prism is fixed in position under one of the first and second objective lenses 7 and 8. An incident beam 20 is reflected by the reflective mirror or the reflective prism. The movable plate 10 has a side edge on which a pole piece 22 is formed. A magnet 24 is slightly distanced from the pole piece to provide a magnetic force to the pole piece 22 whereby the movable plate 10 is forced to rotate around the axis 21. A tracking coil 23 is provided on the magnet 24 so that a large current is applied on the tracking coil 23 to rotate the movable plate 10 for switching the first and second objective lenses 7 and 8. Bistable points exist in the magnetic field between the magnet 24 and the pole piece 22 so that the movable plate 10 is stable in the bistable points of the magnetic field wherein the first and second objective lenses 7 and 8 are positioned over the reflective mirror or the reflective prism. The tracking is made around the axis 21, in the light of which the movable plate 10 is made to rotate at a larger angle than in the tracking process, so as to switch the first and second objective lenses 7 and 8. The first and second lenses 7 and 8 are adjusted to the different two optical disks having different thicknesses so that the above optical head is operable with two different optical disks having different thicknesses by switching the first and second objective lenses adjusted to these two different optical disks.

For the above conventional optical head, the slidable and rotable actuator which is allowed to rotate at a relatively large angle is usable. Notwithstanding, a wire-supporting actuator or a plate spring supporting actuator are not available due to those small movable ranges even those actuators have widely been used.

In the above circumstances, it had been required to develop a novel twin lens optical head device operable with two different optical disks having different thicknesses but not limiting the type of the actuator or allowing various types of the actuator.

It has been also required to develop a novel twin lens optical head device operable with two different optical disks having different thicknesses and capable of recording/replaying operations with a considerably reduced optical loss.

SUMMARY OF THE INVENTION

Accordingly, it is an object of the present invention to provide a novel optical head device with twin lenses operable with two different optical disks having different thicknesses, which allows various types of actuators.

It is a further object of the present invention to provide a novel optical head device with twin lenses operable with two different optical disks having different thicknesses and capable of recording/replaying operations with a considerably reduced optical loss.

The above and other objects, features and advantages of the present invention will be apparent from the following descriptions.

The present invention provides an optical head device comprising: a light source for emitting a laser beam; a polarization beam splitter for receiving the laser beam and dividing first and second linearly polarized beams having first and second polarization directions which are perpendicular to each other; an optical transmission system for receiving the first and second polarized beams and respectively transmitting the first and second linearly polarized beams along first and second optical paths which are parallel to each other; a quarter wavelength plate for receiving the first and second linearly polarized beams and converting the first and second linearly polarized beams into first and second circularly polarized beams having polarization planes rotating in first and second directions opposite to each other; and a pair of first and second objective lenses provided for receiving the first and second circularly polarized beams respectively, the first and second objective lenses having first and second focal lengths which are different from each other, so that any one of the first and second circularly polarized beams is focused on an optical disk surface and then the first and second circularly polarized beams are reflected by the optical disk surface and subsequently transmitted through the first and second objective lenses to the quarter wavelength plate whereby the first and second circularly polarized beams are respectively converted into third and fourth linearly polarized beams having the second and first polarization directions respectively before the third and fourth linearly polarized beams are transmitted through the optical transmission system to the polarization beam splitter whereby the third and fourth linearly polarized beams are transmitted along a common optical path to a single optical detecting system.

BRIEF DESCRIPTIONS OF THE DRAWINGS

Preferred embodiments of the present invention will be described in detail with reference to the accompanying drawings.

DISCLOSURE OF THE INVENTION

Figure 1:
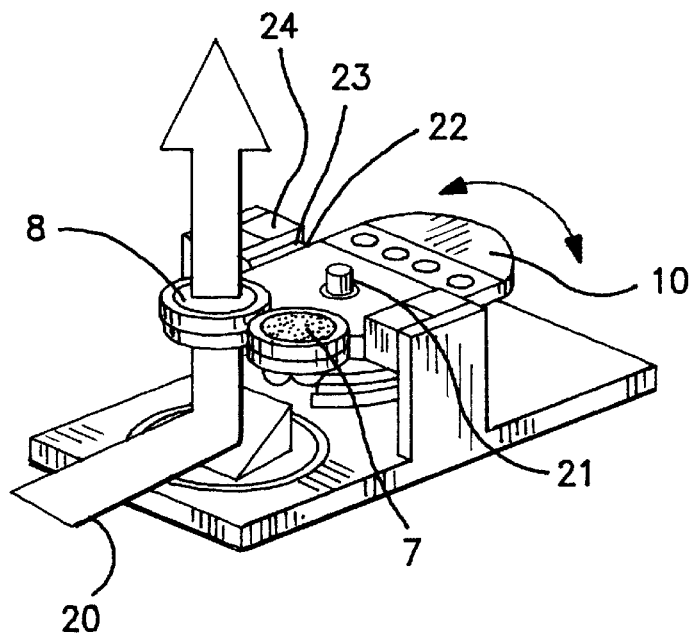
FIG. 1 is a perspective view illustrative of a mechanical structure of the actuator provided in a conventional optical head device having twin lenses.

The present invention provides an optical head device comprising: a light source for emitting a laser beam; a polarization beam splitter for receiving the laser beam and dividing first and second linearly polarized beams having first and second polarization directions which are perpendicular to each other; an optical transmission system for receiving the first and second polarized beams and respectively transmitting the first and second linearly polarized beams along first and second optical paths which are parallel to each other; a quarter wavelength plate for receiving the first and second linearly polarized beams and converting the first and second linearly polarized beams into first and second circularly polarized beams having polarization planes rotating in first and second directions opposite to each other; and a pair of first and second objective lenses provided for receiving the first and second circularly polarized beams respectively, the first and second objective lenses having first and second focal lengths which are different from each other, so that any one of the first and second circulatory polarized beams is focused on an optical disk surface and then the first and second circularly polarized beams are reflected by the optical disk surface and subsequently transmitted through the first and second objective lenses to the quarter wavelength plate whereby the first and second circularly polarized beams are respectively converted into third and fourth linearly polarized beams having the second and first polarization directions respectively before the third and fourth linearly polarized beams are transmitted through the optical transmission system to the polarization beam splitter whereby the third and fourth linearly polarized beams are transmitted along a common optical path to a single optical detecting system.

It is possible that a polarization converter is further provided between the light source and the polarization beam splitter for converting a transmittable linearly polarized beam in polarization direction. In this case, it is preferable that the polarization converter comprises a half-wavelength plate so movable as to be on and off an optical path along which the laser beam is transmitted. Alternatively, it is also preferable that the polarization converter comprises a half-wavelength plate capable of rotating a crystal axis direction.

It is further preferable that the light source is capable of emitting any one of the first and second linearly polarized beams.

It is furthermore preferable that the optical transmission system comprises a single mirror provided adjacent to the polarization beam splitter for reflecting one of the first and second linearly polarized beams divided by the polarization beam splitter.

It is still further preferable that the optical transmission system comprises two mirrors provided adjacent to the polarization beam splitter at different two sides for reflecting the first and second linearly polarized beams divided by the polarization beam splitter.

PREFERRED EMBODIMENTS

A preferred embodiment according to the present invention will be described with reference to the drawings, in which a novel optical head device is provided, which has twin lenses operable with two different optical disks having different thicknesses.

Figure 2:
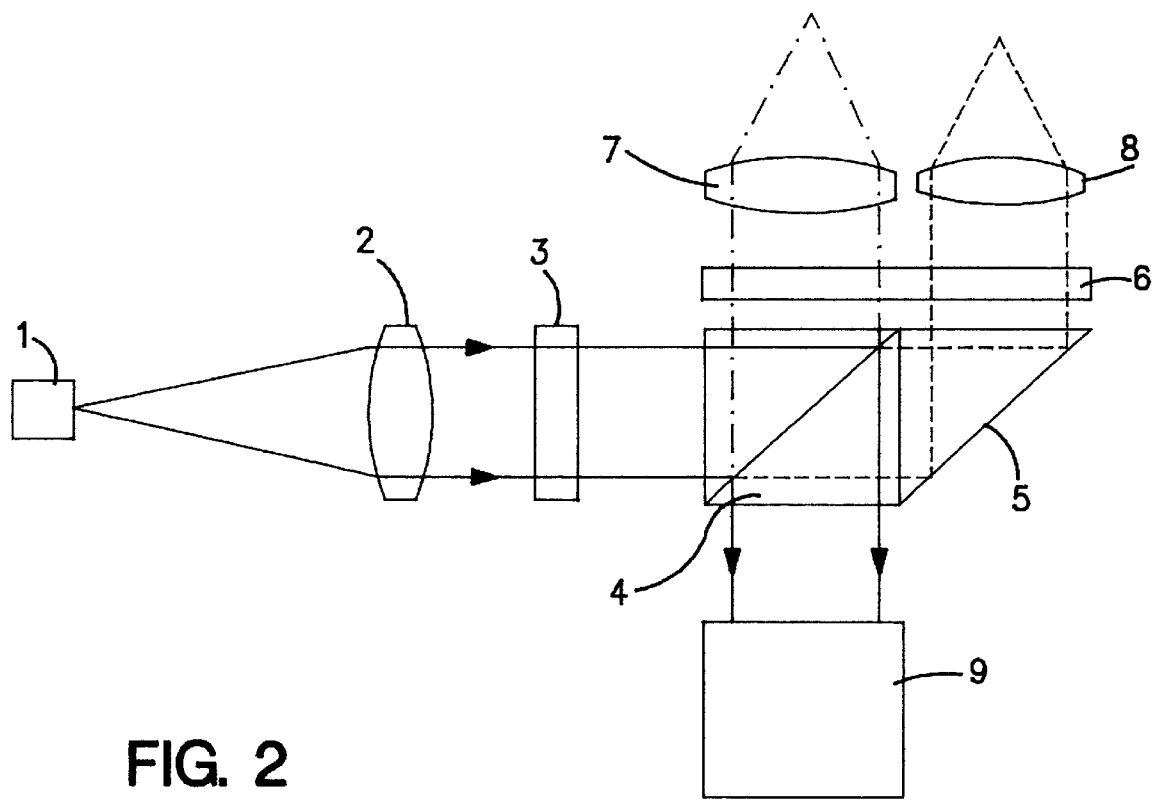
FIG. 2 is a schematic diagram illustrative of a structure of a novel optical head device having twin lenses operable with two different optical disks having different thicknesses in a preferred embodiment according to the present invention.
Figure 7A:
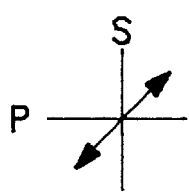
FIGS. 7A through 7D are diagrams illustrative of polarization of an output laser beam emitted by a novel optical head device having twin lenses operable with two different optical disks having different thicknesses in a preferred embodiment according to the present invention
Figure 7B:
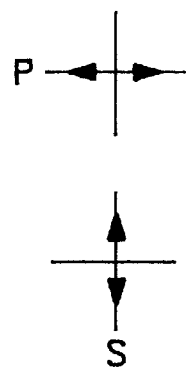
Figure 7C:
Figure 7D:
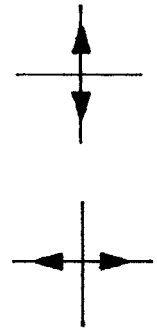

A laser beam source 1 is provided for emitting a laser beam which is divergent. A collimated lens 2 is provided which is distanced from the laser beam source 1 so that the laser beam emitted from the laser beam source 1 is transmitted through the collimated lens 2 whereby the divergent laser beam is converted into a parallel laser beam with no divergence nor convergence. A polarization converter 3 is provided which is distanced from the collimated lens 2 whereby the parallel laser beam is transmitted through the polarization converter 3 for polarizing the parallel laser beam so that the parallel laser beam has a P-polarized component and an S-polarized component as illustrated in FIG. 7A. A polarization beam splitter 4 is further provided, which is distanced from the polarization converter 3 so that the polarized parallel laser beam including both the P-polarized component and the S-polarized component illustrated in FIG. 7A is made incident to the polarization beam splitter 4 whereby the polarized parallel laser beam is isolated into the P-polarized beam and the S-polarized beam as illustrated in FIG. 7B. If the polarization beam splitter 4 is designed to reflect the S-polarized beam, then the above S-polarized beam is reflected, by the polarization beam splitter 4, to be transmitted in a direction perpendicular to the direction in which the laser beam has been transmitted. By contrast, the P-polarized beam is not reflected by but transmitted straight through the polarization beam splitter 4. A reflecting mirror 5 is provided adjacent to the polarization beam splitter 4 so that the P-polarized having been transmitted straight through the polarization beam splitter 4 is reflected, by the mirror 5, to be transmitted in the same direction as the direction in which the S-polarized beam is transmitted or perpendicular to the direction in which the laser beam has been transmitted before entry into the polarization beam splitter 4. As a result, the P-polarized beam having been reflected by the mirror 5 is transmitted in parallel to but distanced from the S-polarized beam having been reflected by polarization beam splitter 4. A quarter wavelength plate 6 is provided which faces the polarization beam splitter 4 and the mirror 5 so that both the P-polarized beam having been reflected by the mirror 5 and the S-polarized beam having been reflected by polarization beam splitter 4 are transmitted through the quarter wavelength plate 6 whereby, as illustrated in FIG. 7C, the S-polarized beam is made into a first circularly polarized beam having a polarization plane rotating in the anti-clockwise direction whilst the P-polarized beam is made into a second circularly polarized beam having a polarization plane rotating in the clockwise direction. First and second objective lenses 7 and 8 are provided to face to the quarter wavelength plate 6. The first and second objective lenses 7 and 8 are aligned in parallel to the surface of the quarter wavelength plate 6 so that the first circularly polarized beam with the first polarization plane rotating in the anti-clockwise direction having been reflected by the polarization beam splitter 4 is transmitted through the first objective lens 7 whilst the second circularly polarized beam with the polarization plane rotating in the clockwise direction having been reflected by the mirror 5 is transmitted through the second objective lens 8. The first and second objective lenses 7 and 8 are differently adjusted to two optical disks which differ in thickness from each other to accord to two different regulations. The first and second circularly polarized beams have been transmitted through the first and second objective lenses 7 and 8 respectively show different convergence so that the first and second circularly polarized beams are focused on surfaces of the different two optical disks which differ in thickness from each other in accordance with two different regulations. That is why as illustrated in FIG. 2, the first circularly polarized beam having been transmitted through the first objective lens 7 is focused at a position farther from the first objective lens 7 than a position at which the second circularly polarized beam is focused. The optical disk, on which the first circularly polarized beam has been transmitted through the first objective lens 7 is focused, is larger in thickness than the other optical disk on which the second circularly polarized beam transmitted through the first objective lens 7 is focused. This means that the surface of the optical disk, on which the first circularly polarized beam is focused, is a larger distance from the first objective lens 7 than a distance between the second objective lens 8 and the other optical disk on which the second circularly polarized beam is focused. The first circularly polarized beam having been transmitted through the first objective lens 7 is focused on the optical disk whilst the second circularly polarized beam having been transmitted through the second objective lens 8 is focused on the other optical disk having a larger thickness than the above optical disk. The first and second circularly polarized beams are reflected by the surfaces of the optical disks and then transmitted back to the first and second objective lenses 7 and 8. The reflected first and second circularly polarized beams are transmitted with divergence and enter into the first and second objective lenses 7 and 8 whereby the first and second circularly polarized beams are made into first and second parallel beams. The first and second parallel beams having been transmitted through the first and second objective lenses 7 and 6 enter into the quarter wavelength plate 8 whereby the first and second parallel beams circularly polarized in the anti-clockwise and clockwise directions and made into the P-polarized and S-polarized beams as illustrated in FIG. 7D.

As described above, the laser beam emitted from the laser beam source 1 is polarized by the polarization converter 3 to have S-polarized component and P-polarized component. The polarized laser beam is then divided by the polarization beam splitter 4 into the S-polarized beam and P-polarized beam. Since the polarization beam splitter 4 is designed to reflect the S-polarized component but transmit the P-polarized component straight, the S-polarized beam is reflected by the polarization beam splitter 4 and then transmitted perpendicular to the direction in which the beam has already been transmitted until a position of the polarization beam splitter 4. By contrast, the P-polarized beam is transmitted straight through the polarization beam spritter 4 and enters into the mirror 5 whereby the P-polarized beam is reflected and then transmitted in the vertical direction to the direction in which the beam has already been transmitted. The S-polarized beam having been reflected by the polarization beam splitter 4 and the P-polarized beam having been reflected by the mirror 5 are transmitted through the quarter wavelength plate 6 whereby the S-polarized beam is made into the first circularly polarized beam with the polarization plane rotating in the anti-clockwise direction whilst the P-polarized beam is made into the second circularly polarized beam with the polarization plane rotating in the clockwise direction. The first and second circulatory polarized beams are then transmitted through the first and second objective lenses 7 and 8 to be focused on the two optical disks differing in thickness from each other, and then reflected by the two optical disks whereby the first and second circularly polarized beams enter into the quarter wavelength plate 6 again. As a result, the first and second circularly polarized beams are made by the quarter wavelength plate 6 into the P-polarized and S-polarized beams respectively. The P-polarized beam enters into the polarization beam splitter 4. The S-polarized beam enters into the mirror 5 and is reflected by the mirror 5 to be transmitted in the reverse direction to the direction in which the beam has been transmitted from the laser beam source 1 through the collimated lens 2 and the polarization converter 3. The S-polarized beam reflected by the mirror 5 enters into the polarization beam splitter 4. As described above, since the polarization beam splitter 4 is designed to reflect the S-polarized component but transmit the P-polarized component straight, the S-polarized beam is further reflected by the polarization beam splitter 4 to be transmitted perpendicular to the direction in which the beam has been transmitted from the laser beam source 1 through the collimated lens 2 and the polarization converter 3. The above vertical direction is reverse to the direction in which the beam is transmitted from the quarter wavelength plate 6 to the objective lenses 7 and 8. Thus, the S-polarized beam having been reflected by the polarization beam splitter 4 is then transmitted in the opposite side to the objective lens. Since the P-polarized beam transmitted through the first objective lens 7 and the quarter wavelength plate 6 is then transmitted straight through the polarization beam splitter 4, an optical detecting system 9 is provided at an opposite side to the first objective lens 7 with reference to the polarization beam splitter 4 so that the P-polarized beam having been transmitted straight through the polarization beam splitter 4 and the S-polarized beam having been reflected by the polarization beam splitter 4 are received by the optical detecting system 9.

From the above descriptions, it can be understood that the beam emitted from the laser beam source 1 is transmitted up to the optical detecting system 9 with only an optical dividing loss when the beam is divided into the S-polarized and P-polarized beams by the polarization beam splitter 4. This means that the S-polarized and P-polarized beams once divided from the beam emitted from the laser beam source 1 are transmitted up to the optical detecting system 9.

Whereas it may be proposed to use the beam splitter without any polarization property for the purpose of dividing the beam into the two beams to be transmitted in different directions, the divided beams are reflected by the optical disks and then each of the divided beams is further divided by the beam splitter into the two twice-divided beams to be transmitted in the different directions. As a result, all of the twice-divided beams are not transmitted to the optical detecting system 9. This means that a certain optical dividing loss appears.

Both the above two S-polarized and P-polarized beams are transmitted to enter into the optical detecting system 9 along the common optical axis, for which reason only a single optical detecting system is operable with two beams that have been transmitted through the first and second objective lenses respectively. As the optical detecting system 9, any servo-error detecting methods already known are available, such as a knife edge method, an astigmatism method, a push-pull method, and a heterodyne method.

As described above, the first and second lenses 7 and 8 are designed for the different optical disks having different thickness in accordance with the different regulations and the first and second lenses 7 and 8 are provided to face to the different two optical disks respectively, for which reason it is not necessary to switch the first and second objective lenses 7 and 8.

Figure 3:
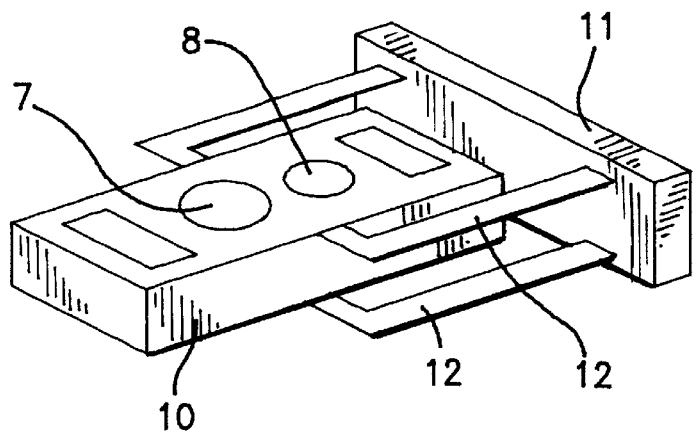
FIG. 3 is a perspective view illustrative of an actuator provided in a novel optical head device having twin lenses operable with two different optical disks having different thicknesses in a preferred embodiment according to the present invention.

With reference to FIG. 3, an actuator of the present invention may include movable portion 10 supported by spring plates 12 which are fixed to a base portion 11. The above first and second objective lenses 7 and 8 are provided.

Figure 4:
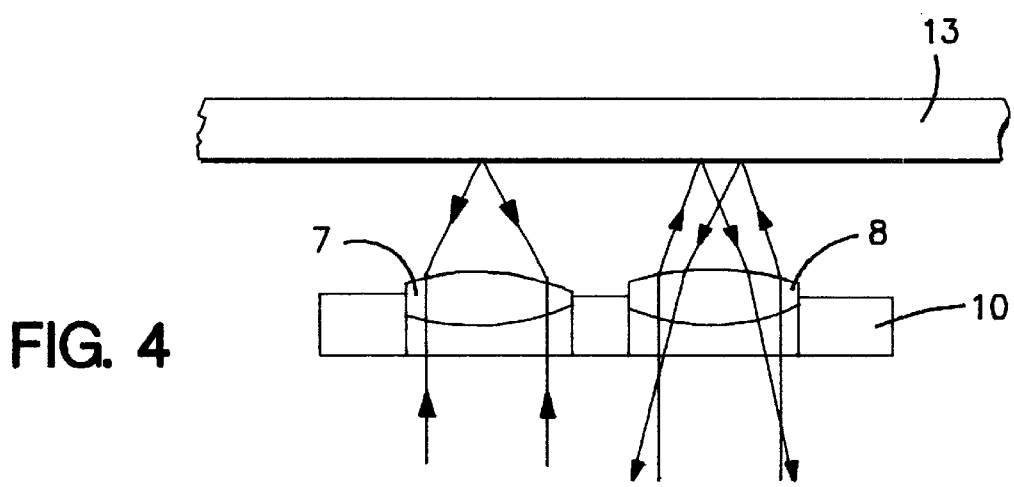
FIG. 4 is a schematic and fragmentary cross sectional elevation view illustrative of twin objective lenses for explaining how to avoid a problem with stray light, involved in a novel optical head device having twin lenses operable with two different optical disks having different thicknesses in a preferred embodiment according to the present invention.

As illustrated in FIG. 4, the first and second objective lenses 7 and 8 have different focal distances so as to avoid any problem with stray light. If the beam having been transmitted through the first objective lens 7 is focused on the optical disk 13, then the beam having been transmitted through the second objective lens 8 is not focused on the optical disk 13. Thus, the beam reflected by the optical disk 13 and then transmitted through the second objective lens is not collimated but is diverging light, for which reason a majority part of the diverging light is not transmitted to the optical detecting system 9, provided a diameter of the optical element is sufficiently small. This means that the intensity of the stray light is so low as to be insubstantial.

It is also possible to settle the above problem with stray light by having the beam incident to any one of the first and second objective lenses, for example, by rotating the polarization plane since the polarization converter is provided between the laser beam source 1 and the polarization beam splitter 4.

If the polarization converter 3 transmits only the S-polarized beam, then the beam is incident only to the first objective lens 7. If, however, the polarization converter 3 transmits only the P-polarized beam, then the beam is incident only to the second objective lens 8. In this case, however, there is no problem with stray light nor disadvantage in generation of any optical dividing loss.

Figure 5:
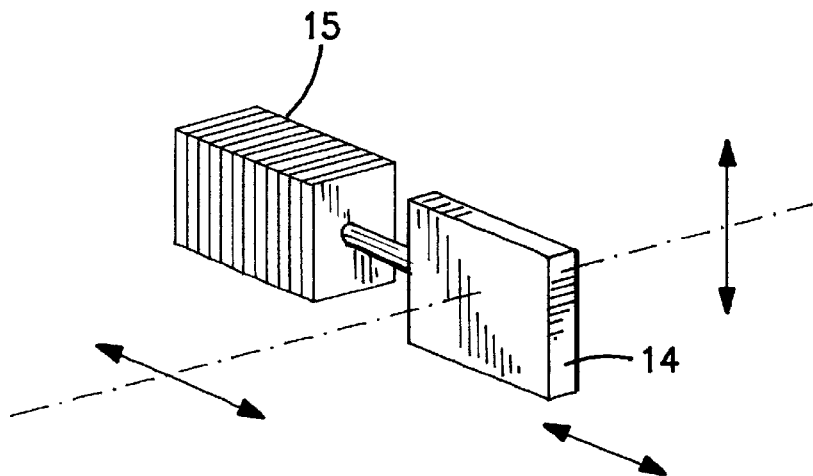
FIG. 5 is a perspective view illustrative of a polarization converter provided in a novel optical head device having twin lenses operable with two different optical disks having different thicknesses in a preferred embodiment according to the present invention.

The polarization converter may comprise a half-wavelength plate 14 movable by a solenoid coil 15 as illustrated in FIG. 5. The laser beam source 1 emits a laser beam which is P-polarized. The half-wavelength plate 14 is set so that a crystal axis is 45 degrees to the incident path of the P-polarized beam If this half-wavelength plate 14 is positioned on the path of the P-polarized beam so that the P-polarized beam is transmitted through the half-wavelength plate 14, then the P-polarized beam is converted by the half-wavelength plate 14 into the S-polarized beam. The S-polarized beam is then transmitted through the first objective lens 7 onto the optical disk. If, however, the above half-wavelength plate 14 is moved out of the path of the P-polarized beam by the solenoid coil 15, then the P-polarized beam is then transmitted to the second objective lens 8.

If, contrary to the above polarization beam splitter 4, the polarization beam splitter 4 is designed to reflect P-polarized beam and transmit S-polarized beam, then the P-polarized beam is transmitted through the first objective lens and the S-polarized beam is transmitted through the second objective lens.

Figure 6:
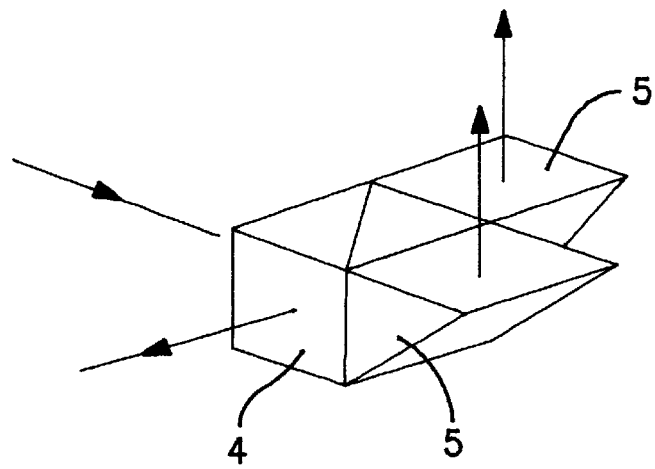
FIG. 6 is a perspective view illustrative of a polarization beam spritter united with mirrors used in a novel optical head device having twin lenses operable with two different optical disks having different thicknesses in a preferred embodiment according to the present invention.

In the above optical system, the lengths of the two optical paths are different. Notwithstanding, it is possible to set the two optical paths at the same length by using two mirrors as illustrated in FIG. 6 wherein both the S-polarized and P-polarized beams are reflected by the two mirrors respectively and then enter into the first and second objective lenses 7 and 8. In this case, it is possible to use, in place of the collimated lens 2, the objective lens of finite system so that the whole structure is made simple.

In place of the movement of the half-wavelength plate 14 by use of the solenoid coil 15, it is also possible to rotate the crystal axis direction of the half-wavelength plate 14 by 45 degrees for switching the type of the polarization of the transmittable beam.

It is also possible not to use the polarization converter 3. In this case, the first and second objective lenses 7 and 8 have different focal distances as described above with reference to FIG. 4 in order to avoid any problem with stray light.

In place of the first and second objective lenses 7 and 8 being provided on the single movable plate 10 illustrated in FIG. 3, the first and second objective lenses 7 and 8 may be provided on different two movable plates respectively.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. An optical head device comprising:
a light source providing first and second linearly polarized beams having first and second polarization directions that are perpendicular to each other;
a polarization beam splitter system receiving and dividing said first and second linearly polarized beams, and transmitting said first and second linearly polarized beams along first and second optical paths which are parallel to each other;

a quarter wavelength plate for receiving said first and second linearly polarized beams and converting said first and second linearly polarized beams into first and second circularly polarized beams having polarization planes rotating in first and second directions opposite to each other;

a pair of first and second objective lenses for receiving said first and second circularly polarized beams respectively, said first and second objective lenses having first and second focal lengths which are difference from each other, so that either one of said first and second circularly polarized beams is focused on an optical disk surface and then said first and second circularly polarized beams are reflected by said optical disk surface and subsequently transmitted through said first and second objective lenses to said quarter wavelength plate, whereby said first and second circularly polarized beams are respectively converted into third and fourth linearly polarized beams having said second and first polarization directions respectively before said third and fourth linearly polarized beams are transmitted through said optical transmission system to said polarization beam splitter, whereby said third and fourth linearly polarized beams are transmitted along a common optical path to a single optical detecting system.

2. The optical head device as claimed in claim 1, wherein said light source comprises a polarization converter for converting a transmittable linearly polarized beam in a polarization direction.

3. The optical head device as claimed in claim 2, wherein said polarization converter comprises a half-wavelength plate movable as to be in or out of an optical path along which light from said light source is transmitted.

4. The optical head device as claimed in claim 2, wherein said polarization converter comprises a half-wavelength plate capable of rotating a crystal axis direction.

5. The optical head device as claimed in claim 1, wherein said light source is capable of emitting any one of said first and second linearly polarized beams.

6. The optical head device as claimed in claim 1, wherein said beam splitter system comprises a single mirror adjacent to a polarization beam splitter for reflecting one of said first and second linearly polarized beams divided by said polarization beam splitter.

7. The optical head device as claimed in claim 1, wherein said beam splitter system comprises two mirrors provided adjacent to a polarization beam splitter at different two sides for reflecting said first and second linearly polarized beams divided by said polarization beam splitter.

\* \* \* \* \*